Sept. 10, 1957 A. J. HATCH 2,806,167
ARC LAMP
Filed Dec. 17, 1953 5 Sheets-Sheet 1

INVENTOR
ARTHUR J. HATCH
BY
Harry C. Ernsberger
ATTORNEY

Sept. 10, 1957　　A. J. HATCH　　2,806,167
ARC LAMP

Filed Dec. 17, 1953　　5 Sheets-Sheet 2

Fig. 4　　Fig. 5

INVENTOR
*ARTHUR J. HATCH*
BY
*Harry C. Emsberger*
ATTORNEY

Sept. 10, 1957  A. J. HATCH  2,806,167
ARC LAMP
Filed Dec. 17, 1953  5 Sheets-Sheet 3

INVENTOR
ARTHUR J. HATCH
BY
Harry O. Ernsberger
ATTORNEY

Sept. 10, 1957 — A. J. HATCH — 2,806,167
ARC LAMP
Filed Dec. 17, 1953 — 5 Sheets-Sheet 4

INVENTOR
ARTHUR J. HATCH
BY
Harry P. Ernsberger
ATTORNEY

Fig_14

United States Patent Office 2,806,167
Patented Sept. 10, 1957

2,806,167

ARC LAMP

Arthur J. Hatch, Toledo, Ohio, assignor to The Strong Electric Corporation, Toledo, Ohio, a corporation of Delaware Application December 17, 1953, Serial No. 398,654

13 Claims. (Cl. 314—69)

This invention relates to arc lamps, and more especially to arc lamps adaptable for use in the graphic arts field, and may be employed to advantage wherever intense illumination of substantially constant intensity is desired.

It is essential for graphic art reproductions to employ an arc lamp in which the arc may be quickly established and the characteristics of the arc maintained substantially constant in order to provide constant high-intensity illumination. It has been a practice to utilize lever mechanism disposed above one of the carbons or electrodes and operable to move the carbon for striking the arc and motive means for moving the carbons for accurately compensating for the consumption or burning of the carbons. During the operation of an arc lamp, the combustion of the carbons or electrodes produces fine particles of oxidized material or ash which is carried upward by the heat of the arc and collects upon components of the lamp structure.

By reason of the positioning of an arc-striking arrangement above the arc, the mechanism is subjected to the intense heat of the arc and the fine particles of oxidized carbon or ash accumulate upon the components of the mechanism, impairing the operation thereof. In such an arrangement, the lever mechanism and its actuating solenoid must be mounted upon a movable carriage directly supporting the upper carbon and places a substantial load upon the mechanism for moving the carriages which support the upper and lower carbons or electrodes.

The present invention contemplates an arrangement for initially separating the carbons or electrodes to strike the arc which is disposed in a zone below and remote from the carbons whereby the heat of the arc does not affect the arc-striking mechanism.

An object of the invention resides in a mechanism for initially separating the carbons of an arc lamp to strike the arc which is enclosed in a zone remote from the arc whereby accumulation of oxidized material or carbon ash on the mechanism is avoided or eliminated.

Another object o fthe invention resides in the provision of an electrode-separating or arc-striking mechanism for an arc lamp which may be substantially enclosed to prevent foreign matter or dust from accumulating on the mechanism and which is not subjected to the intense heat of the arc.

Another object of the invention resides in the provision of a motor and means associated therewith for adjusting the carbons of the arc to maintain the arc at a substantially constant intensity in combination with means for causing relative movement of the motor housing or support to effect an initial separation of the carbons of the lamp for striking the arc.

Another object of the invention is the provision of a pair of carriages, each of which supports one of the carbons for forming the arc, which may be of substantially identical construction, facilitating economical manufacture and interchangeability of parts of the mechanism.

A further object of the invention resides in the provision of an arc lamp wherein the carbon-supporting carriages are of substantially equal weight whereby the forces resulting from the weights of the carriage mechanisms are substantially equalized or balanced about the axis of a carriage-actuating means whereby a comparatively small amount of energy is required to actuate and adjust the carbon-supporting carriages in maintaining a constant arc.

Still another object is the provision of an electrode-actuating-and-control mechanism arranged to be influenced by dual forces wherein one force is effective to separate the electrodes to establish an arc and another force is operative to maintain accurate control of the energy flow through the electrodes to provide an arc of substantially constant intensity.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the arc lamp of this invention has particular utility for lighting purposes in the graphic arts field, it is to be understood that utilization of the lamp is contemplated wherever substantially constant, high-intensity illumination is desired.

Figure 1:
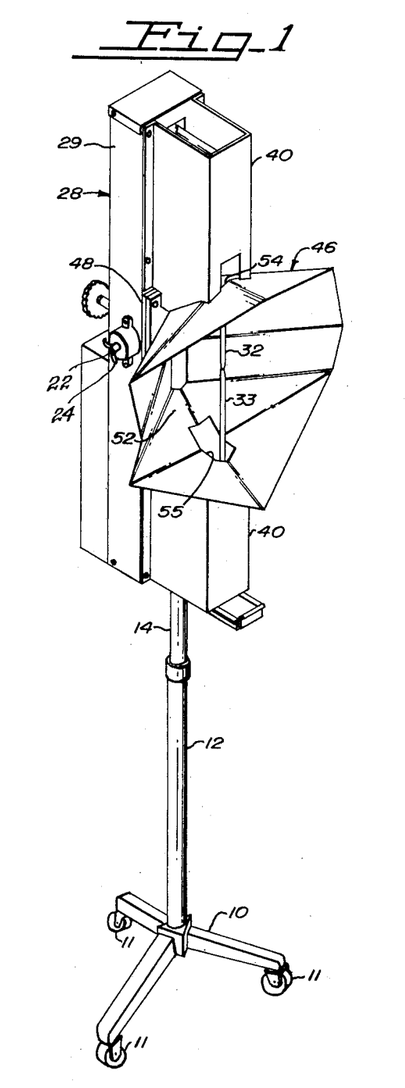
Figure 1 is an isometric view illustrating an arc lamp embodying the invention.
Figure 2:
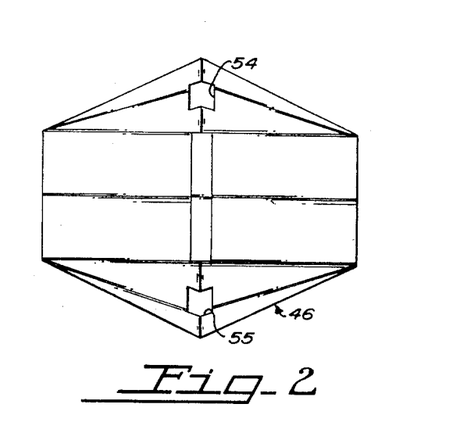
Figure 2 is a front elevational view of a reflector arrangement for controlling the light rays emanating from the arc.
Figure 3:
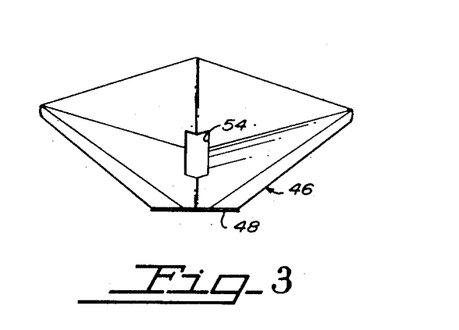
Figure 3 is a top plan view of the reflector shown in Figure 2.
Figure 4:
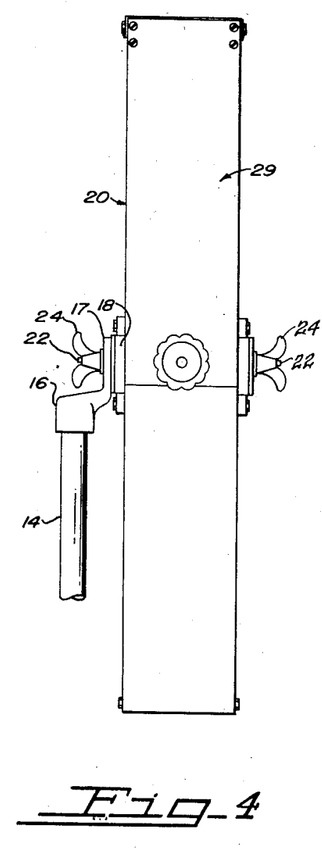
Figure 4 is a rear view of the housing structure enclosing the carbon-supporting carriages and components of the carriage-actuating means.

Referring to the drawings in detail, a lamp embodying the arrangement of the invention and supporting means therefor is illustrated in Figure 1. The lamp construction may be mounted upon a suitable support, preferably of a portable character, and as illustrated includes a base 10 provided with casters 11, the base being formed with a tubular member 12 which has a rod 14 telescoped therein upon which the lamp construction is mounted. As illustrated in further detail in Figure 4, the upper end of the rod 14 may be provided with a fitting 16 having a vertically extending portion 17 adapted for frictional, clamping engagement with a fitting 18 carried by the lamp housing 20. A threaded clamping bolt 22 extends through the portion 17 and the fitting 18 and is equipped with a wing nut 24 which may be drawn up to secure the lamp structure in desired angular position with respect to its supporting means in order to project the light rays in a desired direction. The casters 11 facilitate movement of the lamp to a desired position of use.

The lamp structure includes a combined frame-and-housing arrangement which includes channel-shaped members 29 and 30. Secured to the member 30 is a pair of channel-shaped members 40, the members 29, 30 and 40 providing a housing structure enclosing mechanisms for supporting the electrodes or carbons 32 and 33. When spaced a proper distance apart and current caused to flow therethrough, the carbons provide an arc at the zone 35 between the carbons.

The channel-shaped members 29 and 30 are preferably fashioned of sheet metal. The member 29 is formed with opposing leg or wall portions 37 which are straddled by the opposing wall portions 38 of a channel-shaped member 30, the channel-shaped members 40 being secured to the member 30 by means of rivets 41 or other suitable securing means. The wall portions 38 of member 30 are secured to the housing member 29 by means of rods 43 equipped with securing nuts 44, the latter being drawn into engagement with the side walls 38 to hold the members 29 and 30 in assembled relation. The members 29, 30 and 40 provide a frame structure as well as a housing 20 supporting and enclosing elements of the lamp structure.

Disposed between the channel-shaped sections 40 and secured to the channel-shaped member 30 is a reflector construction 46. The reflector construction is provided with a base plate 48 which is secured to the member 30 by suitable means. An asbestos pad or plate 50 may be disposed between the plate 48 and the member 30 to serve as a thermal barrier to retard the transmission of heat from the arc to the enclosure formed by members 29 and 30.

Figure 5:
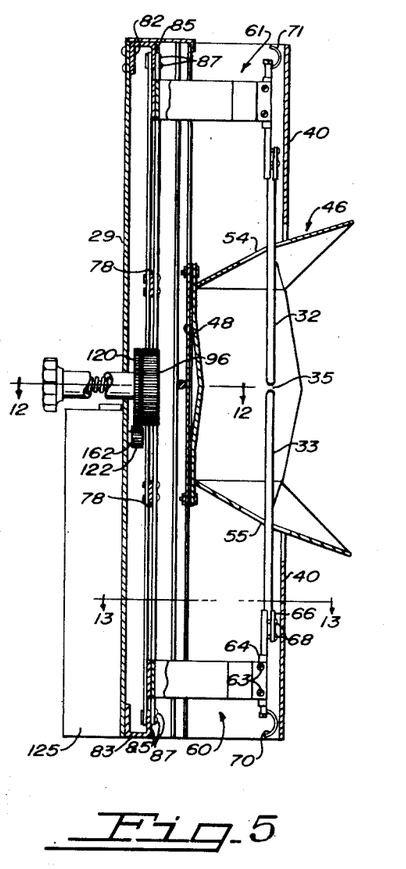
Figure 5 is a vertical sectional view through the lamp construction illustrating the carbon-supporting carriage means and actuating devices therefor.

The reflector 46 is inclusive of several pairs of reflecting surfaces, the surfaces of each pair being angularly disposed with respect to each other and to the other surfaces to provide a plurality of reflecting surfaces or zones for directing the light from the arc in the desired directions to secure substantially uniform distribution of light upon a subject. The reflecting surfaces are arranged so that the zones of projected light are overlapped in a manner to avoid shadows, a factor which is important in photographic work. Upper and lower surface portions of the reflector respectively engage edge portions of the channel-shaped members 30 as shown in Figures 1 and 5. The upper and lower portions of the reflector are provided respectively with openings 54 and 55 to provide for ventilation so that heat from the arc may be dissipated into the ambient atmosphere.

The chambers or enclosures provided by the channel-shaped members 29, 30 and 40 are adapted to enclose carriage means for supporting the carbons 32 and 33 and operating means for effecting relative movement of the carriages to compensate for the consumption or burning of the carbons during use. As particularly shown in Figure 5, the carbons are respectively supported upon brackets or carriages 60 and 61. These carriages are of identical construction and a description of one will suffice for both. Each carriage consists of a substantially U-shaped member or bracket 62, and disposed between the leg portions thereof is a block 64 having a vertically disposed V-shaped recess to accommodate one of the carbons or electrodes. A clamping element or plate 66, secured to the block 64 by screws 68, is adapted to hold the carbon securely in the recess in the block. The block 64 is secured to the member 62 by means of screws 63.

By manipulating the screws 68, the clamping plate 66 may be loosened and the carbon or electrode adjusted or replaced when necessary. The current is supplied to the carriage supporting electrode 33 by means of a flexible current conductor 70, and current is supplied to the carriage 61 supporting the upper carbon 32 by means of a flexible current conductor 71.

The arrangement includes means connected with the brackets or carbon carriages 60 and 61 for moving the carriages to determine the positions of the electrodes. Disposed within the channel-shaped member 30 is a skeleton or supplemental frame formed of a pair of tubular members 74 and 75 arranged in substantially parallel relation and extending longitudinally of the channel-shaped member. Each of the tubular members is formed with flanges 76 extending lengthwise of the members and spaced to provide or define in each member a longitudinally extending slot. Plates or members 78 fixedly connect the members 74 and 75 by means of screws 80. Secured to the upper and lower end zones of the channel-shaped member 29 are brackets 82 and 83. These brackets are formed with projections 85 which extend into the slots adjacent the ends of the tubular members 74 and 75 and are secured thereto by means of screws 87. The plates 78 and the brackets 82 and 83 serve to hold the tubular members 74 and 75 in fixed parallel relation.

Disposed within tubular member 75 is a rod 90, preferably of circular cross section, which is secured at its upper end to a plate or element 91 by rivets 92 or other suitable means. The upper carriage 61, supporting the carbon or electrode 32, is secured to the plate 91 by means of a bolt 93 and nut cooperating therewith. The zone of the rod below the plate 91 is formed with teeth 95 forming a rack adapted for enmeshment with the teeth of a driving gear or pinion 96. The tubular member 75 provides a guiding means for the rod or bar 90.

Figures 8, 9:
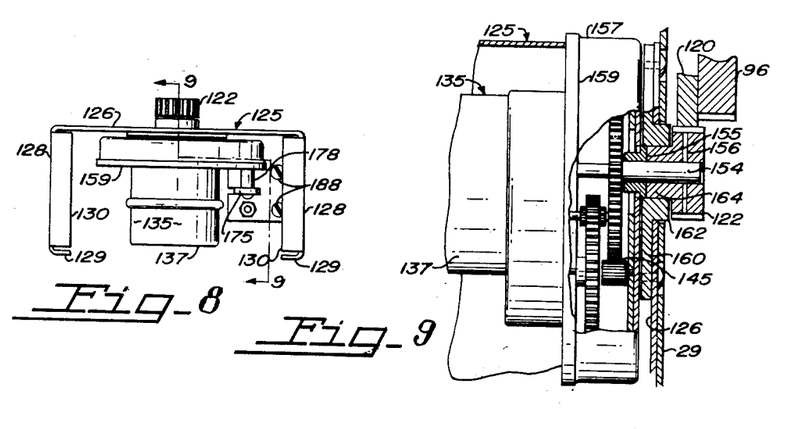
Figure 8 is a top plan view of the arrangement shown in Figure 6.
Figure 9 is a fragmentary sectional view taken substantially on the line 9—9 of Figure 8.
Figure 11:
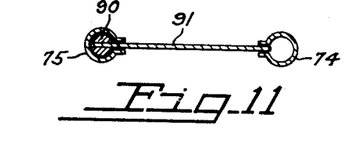
Figure 11 is a fragmentary detail sectional view taken substantially on the line 11—11 of Figure 10.

Disposed for slidable movement in the tubular member 74 is a second rod 98 which is secured at its lower end to the carbon-supporting carriage or bracket 60. The upper portion of the rod 98 is formed with a toothed rack 100 adapted to mesh with the teeth of gear 96 as illustrated in Figures 9 and 11. It will be apparent that rotation of the gear 96 will move the rods 90 and 98 and the electrode-supporting brackets or carriages respectively carried thereby simultaneously in opposed directions. Thus longitudinal movement of the rods 90 and 98 causes the electrodes or carbons 32 and 33 to be moved toward or away from each other, depending upon the direction of rotation of the gear 96.

The gear 96 is arranged to be rotated by both manual and power-actuated means. The power-actuated arrangements for actuating the gear 96 involve the application of dual forces including a means for initially rotating the gear 96 to separate the electrodes or carbons 32 and 33 and initiate or strike the arc and means for automatically actuating the gear 96 to maintain the proper spacing between the electrodes after the arc is formed in order to maintain an arc of substantially constant intensity.

Figure 10:
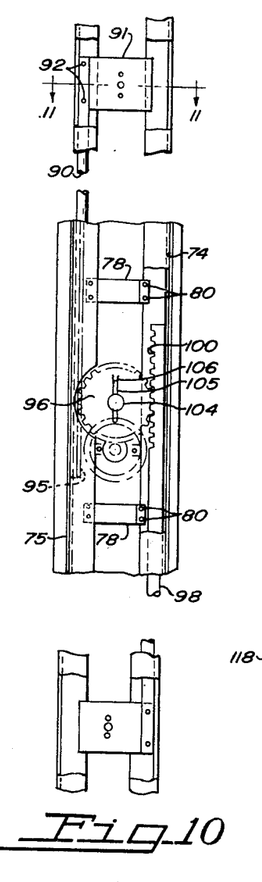
Figure 10 is a fragmentary elevational view illustrating the driving means for the electrode-supporting devices.
Figure 12:
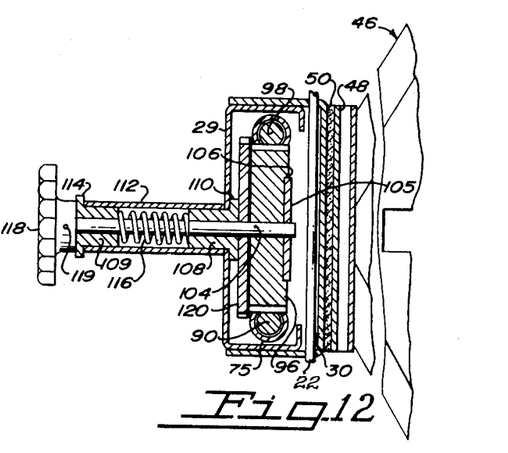
Figure 12 is a transverse vertical sectional view taken substantially on the line 12—12 of Figure 5.

With particular reference to Figures 10 and 12, it will be seen that the gear 96 is mounted upon an actuating shaft 104 which is formed with a transverse opening to receive a pin or key 105 which is adapted to engage or nest in a groove 106 formed in one face of the gear 96 to establish a drive connection between the shaft 104 and the gear 96. The shaft 104 extends through longitudinally spaced guide bushings or bearing members 108 and 109, the bushing 108 being formed with a flange or shoulder 110 adapted to engage the web portion of the channel-shaped member 29, and serves to limit longitudinal movement of the bushing 108. Surrounding the bushings 108 and 109 is a cylindrical sleeve 112, the bushing 109 being provided with a shoulder or flange 114 engaging the end of the sleeve which defines the spacing of the bushings 108 and 109. Disposed within the sleeve 112 in the space between the bushings 108 and 109 is a resilient means in the form of an expansive coil spring 116. Secured upon the outer end of the shaft 104 is a manipulating handle or knob 118 held on the shaft by means of a pin 119. The knob 118 provides a manual means for rotating the shaft 104 and gear 96 to adjust the relative positions of the rods 90 and 98 and, hence, the electrodes 32 and 33.

Journally supported on the shaft 104 is a gear 120 which is enmeshed with a pinion 122, as shown in Figure 5, which is adapted to be driven or rotated by power means to actuate the gear 96 and move the carbons or electrodes 32 and 33. Adjacent faces of gears 96 and 120 are in engagement and, under the influence of the expansive pressure of coil spring 116 on the bushing 108, are held together by sufficient friction whereby rotation of the gear 120 caused by the driving gear 122 is transmitted to the gear 96.

In the illustrated embodiment of the invention, the driving gear or pinion 122 is actuated or rotated by dual power means. The pinion 122 is given an initial rotation in one direction which is effective through the gears 96 and 120 and the rods 80 and 98 to separate the electrodes or carbons 32 and 33 to strike the arc. The driving pinion 122 is also adapted to be rotated in the opposite direction in order to regulate and control the spacing of the carbons to maintain an arc of substantially constant intensity.

As particularly shown in Figures 5 through 9, there is a housing member 125 secured to the lower portion of channel-shaped member 29, the housing member 125 being of generally U-shaped configuration and includes a web or central wall portion 126 and projecting parallel legs or side walls or portions 128. The side walls 128 are formed with laterally extending, vertically disposed flanges 129, and the upper and lower end zones of the walls are formed with horizontally extending flanges 130 to receive a cover or closure member 132, shown in Figure 7, which is secured to the housing member 125 by means of screws 134 extending into threaded openings formed in the flanges.

An electric motor 135 is provided for rotating the drive pinion 122 to regulate the spacing between the electrodes 32 and 33 to control the arc. The motor 135 is preferably of the synchronous type, the armature of which is adapted to be rotated at comparatively low speed, for example, 240 revolutions per minute, and is connected through suitable gearing to operate the drive pinion 122 at a comparatively low speed. The motor 135 is inclusive of a substantially circular housing 137 which journally supports a rotatable armature (not shown). The shaft supporting the motor armature is connected by reduction gearing 145 of conventional character to an output or driven shaft 154 shown in Figure 9. The shaft 154 is journaled in a bearing 155 carried by a housing or cover 157. The shaft 154 projects through a flanged member 160 which is secured to the web or wall 126 of the housing or enclosure 125 by means of screws 161. The reduction gearing 145 is contained within the cover or enclosure 157 which is secured to a plate 159 carried by the motor housing 137. The member 160 is provided with a boss portion 162 which is bored to receive a tenon or extension 164 formed on the drive pinion 122. The pinion 122 is secured on the shaft 154 by means of a pin 156. The bore in the boss portion 162 forms a journal or bearing for the tenon 164 to revolubly support the motor 135, the reduction gearing 145 and a housing 157 enclosing the gearing. The motor is energized in a manner hereinafter explained in connection with the description of the electrical circuits illustrated in Figure 14. A means associated with the motor 135 is provided for initially separating the electrodes or carbons to strike the arc. In the embodiment illustrated this means is adapted to cause relative movement of the motor housing 137 and associated mechanism to effect a movement of the drive gear 122 in a direction to move the rack rods 90 and 98 in directions to separate the carbons.

Figures 6, 7:
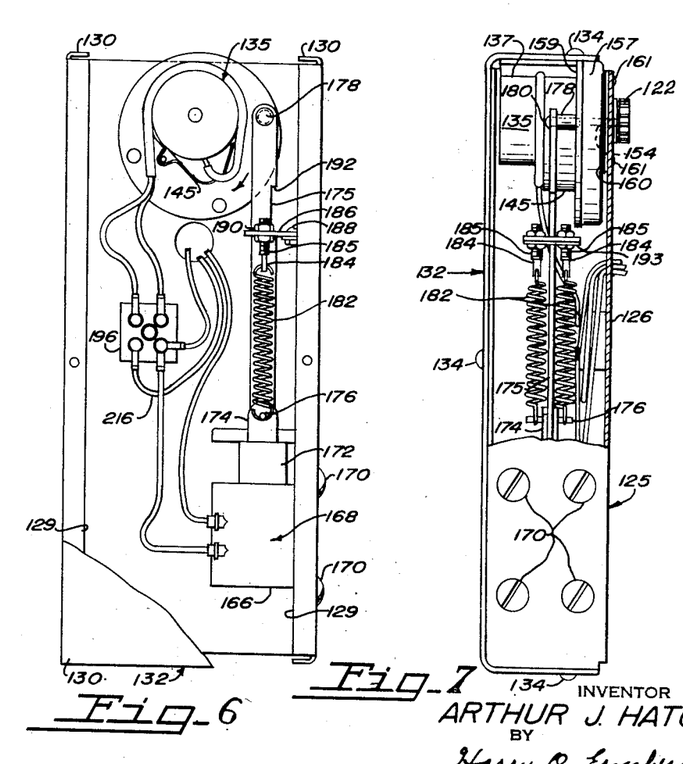
Figure 6 is a rear view of the mechanism for striking and adjusting the arc.
Figure 7 is a side elevational view, partly in section, illustrating the mechanism shown in Figure 6.

One form of apparatus for effecting the separation of the carbons to strike the arc is illustrated in Figures 6 through 8. Supported upon the housing member 125 is an electrically energizable, electromagnetic device or solenoid 167 enclosed in a casing or frame 166 which is secured to the housing member by means of screws 170. A relatively movable core member or armature 172, which is adapted to be actuated by energization of the coil 167, is provided with a pair of members or clips 174 to which a link 175 is connected by means of a pin 176 passing through aligned openings in the clips and link. The upper end of the link is provided with an opening to receive a pin 178 which is secured to the plate 159 carried by the motor housing 137. The pin 178 is swaged as at 180 to hold the link in pivotal connection with the pin. Thus, downward movement of the armature 172, under the influence of the energized solenoid 168, causes the motor housing 137, plate 159, housing 157, reduction gearing 145 and the drive pinion 122 to be rotated through a radial angle in a clockwise direction as viewed in Figure 6. By reason of the high gear reduction between the motor armature and the drive pinion 122, the rotative movement of the motor housing and associated mechanism caused by the downward movement of the link 175 effects substantially the same rotation of gear 122 which operation is effective to rotate gears 120 and 96 and separate the carbons 32 and 33.

The motor housing 137 and the components and mechanism associated therewith are normally held in one position by the biasing tension of springs 182. The lower ends of the springs 182 are connected to the pin 176 and the upper ends of the springs are connected with members 184 which are provided with threaded portions 185 which extend through openings in a plate 186 secured to an L-shaped bracket 187 by means of screws 188. The bracket 187 is welded or otherwise secured to a wall of housing 125. The threaded portions 185 of members 184 are equipped with pairs of securing nuts 190. By manipulating the nuts 190 the members 184 may be adjusted relative to the plate 186 to regulate the degree of tension or biasing stress exerted by the springs 182.

The link 175 is provided with a recess bounded by ledges 192 and 193 which are selectively adapted for engagement with plate 186 to limit the vertical movement of the link in both directions and thus determine the initial position and the extent of relative rotation of the motor housing 137 and its associated components. As viewed in Figures 6 and 7, the tension or biasing stress or force of springs 182 is upward and engagement of the ledge 193 of the link with the plate 186 determines the initial or normal position of the motor housing 137. When the coil 167 of the solenoid 168 is energized, the armature 172 and the link 175 are pulled or drawn downwardly against the tension stress in the springs 182, thus rotating the motor housing 137 and by reason of the locking action of the high reduction gearing 145 rotating the gear 122 in a clockwise direction as viewed in Figure 6 to strike the arc.

As hereinafter described, current is delivered to the motor contained within housing 137, initiating rotation of the motor armature and rotation of the gearing 145 to the drive pinion or gear 122 in a counterclockwise direction as viewed in Figure 6. When current is supplied through the carbons or electrodes to form the arc, the drive pinion 122 is rotated by relative rotation of the motor housing 137 caused by movement of the solenoid armature 172 to separate the electrodes and form the arc. Concomitantly with this action, electrical energy is delivered to the motor, causing its armature to rotate, which initiates a very slow rotation of drive gear 122 in the opposite direction through the speed reduction gearing contained in the motor housing 137 and housing 157 to slowly move the carbons or electrodes toward each other to regulate and control the electrode spacing and hence the intensity of the arc.

With this construction of relatively movable motor housing arranged to cause corresponding movement of the drive gear 122, an effective means is provided for striking the arc. The solenoid and link arrangement for accomplishing this function is disposed in a position where it is substantially unaffected by the oxides or ash resulting from the burning carbons and is removed from the zone of intense heat from the arc and hence is reliable in its operation. A junction block 196 shown in Figure 6 may be employed to facilitate connections of the motor 35 and solenoid coil 167 with the power transformer from which current is derived for operation of the mechanisms.

Figure 14:
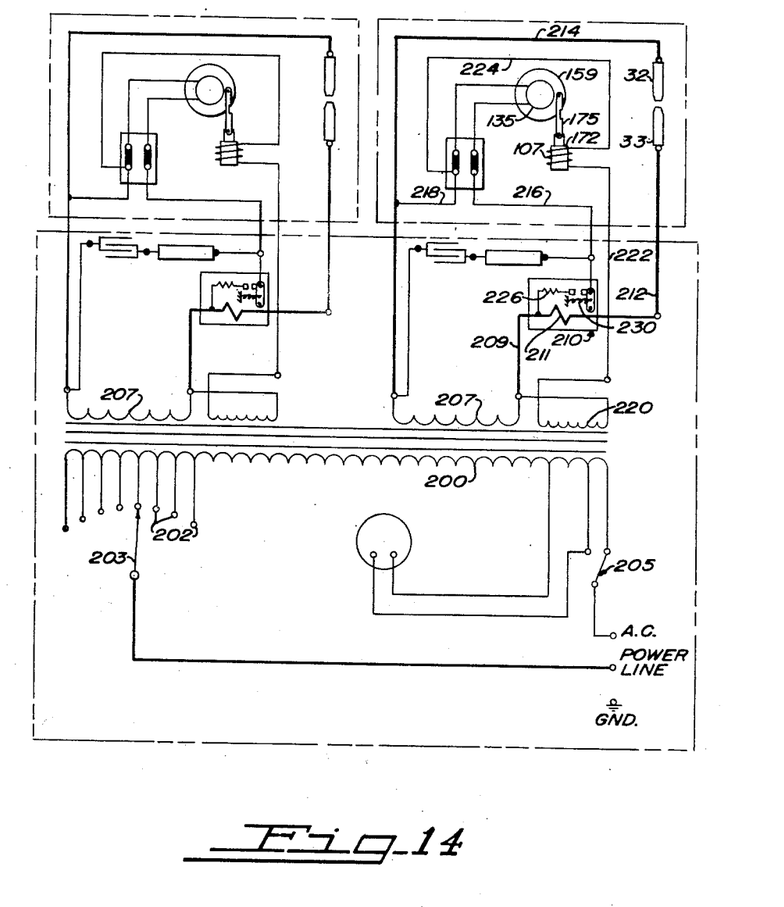
Figure 14 is a schematic circuit diagram for a pair of arc lamp constructions of the present invention, operated from a single transformer.

It has been previously stated herein that the arc lamps of the present invention may be advantageously used in pairs, especially in photographic work, although a single lamp may be used where desired. When two lamps are used concomitantly, it is preferable to employ a single power transformer having dual secondaries adapted to provide energy for the arcs of both lamps, the arc control relays, the motors 135 and supplemental transformer coils for actuating the solenoids for striking the arcs. A schematic circuit diagram for a pair of arc lamp constructions of the present invention, operated from a single transformer, is illustrated in Figure 14. In the circuit diagram, the transformer T incudes a primary winding 200 provided with a series of taps 202 cooperating with a tap switch 203. A range switch 205 is associated with the primary circuit for cutting out a certain portion of the primary winding, a fine adjustment being attained through the proper positioning of the switch 203 with the contacts 202. These switches are provided to accommodate or provide adjustment to the voltage of the power line with which the transformer is connected. As illustrated in Figure 14, the transformer is provided with two secondary windings 207, each secondary being connected with one of the arc lamp units. The circuits for the arc lamps are identical and, hence, a description of only one of the lamp circuits of Figure 14 will suffice for both. One end of the secondary 207 is connected by a conductor 209 to a current-responsive relay 210 through the relay winding 211 and conductor 212 to the carbon or electrode 33. The electrode 32 is connected to the other end of the secondary winding 207 by a conductor 214. One of the contacts of the relay 210 is connected by means of a conductor 216 with the drive motor 135, another conductor 218 being connected to conductor 214 and, hence, to the secondary winding 207.

Figure 13:
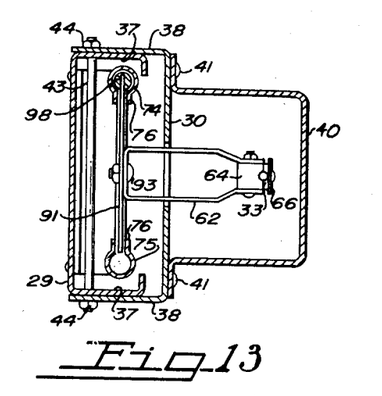
Figure 13 is a transverse sectional view taken substantially on the line 13—13 of Figure 5.

The present invention includes a winding associated with the transformer T for impressing voltage on the solenoid coil 167 to actuate the solenoid armature 172, rotating the motor housing 135 and gear 122 to initially separate the electrodes when current is directed through the electrode circuit in order to establish the arc. As shown in Figure 13, the transformer is provided with an auxiliary or supplemental winding 220 which is wound in opposition to the adjacent secondary winding 207. The winding 220 is connected by means of a conductor 222 with the coil 167 of the solenoid 168, the other end of the coil 167 being connected by conductors 224, 218 and 214 with the secondary 207 of the transformer.

The secondary winding 207 of the transformer is loosely coupled with the primary winding 200, and the supplemental or auxiliary winding 220 is closely coupled with the primary winding. The differential in voltage impressed in the secondary winding 207 and the auxiliary winding 220 coupled with the phase shift of the secondary under heavy load is utilized to actuate or energize the winding 167 of the solenoid 168 to rotate the motor housing 137 and drive gear 122 through a sufficient angular distance to separate the electrodes 32 and 33 for striking the arc.

Assuming that the electrodes or carbons 32 and 33 are in contact and it is desired to establish the arc, current is delivered to the primary winding of the transformer from the source of current supply. As the electrodes are closed, that is, in contacting relation, a comparatively large amount of current flows through the secondary 207 and results in a substantial drop in voltage in the secondary. Simultaneously voltage is impressed in the closely coupled auxiliary winding 220 which is of a substantially constant value. Concomitantly with the voltage drop in the secondary 207 under load, a substantial phase shifting occurs such that there is established a differential or resultant voltage vector of sufficient value to energize the coil 167 of the solenoid device 168, actuating the armature 172 and link 175 to rotate motor housing 137, reduction gearing 145, housing 157, drive gear 122 and driven gears 120 and 96 to move rack rods 90 and 98 in opposite directions to separate the carbons 32 and 33 to strike the arc. After the arc is established, the current flow in the secondary 207 is decreased, but there still remains a sufficient differential voltage effective on the solenoid coil 167 to hold the armature 172 in its lowermost position against the tension of the springs 182 as long as current flows through the arc between the carbons.

The independent function of the drive motor 135 is to compensate for the burning away or consumption of the carbon electrodes, the motor armature, when energized, rotating in a direction to move the electrodes toward each other as the carbons are burned away so as to maintain an arc of substantially constant intensity between the electrodes. The energization of the motor armature to effect rotation of the gear 122 at a very low speed through the reduction gearing 145 is controlled through the medium of the current-responsive relay 210. This relay 210 includes an auxiliary or supplemental coil 226. One end of the coil 226 is connected to the current supply conductor 209 leading from the secondary 207 of the transformer to one side of the main relay coil 211. The other end of the supplemental coil 226 is connected to one of the contacts of the relay 210, thus placing the supplemental coil 226 in series in the motor circuit. In practice it has been found that an auxiliary or supplemental coil 226 consisting of approximately 80 turns of #28 insulated copper wire is satisfactory for the purposes herein set forth. The supplemental coil 226 is wound in a direction to augment or increase the magnetic flux of the coil 211 of the relay and thus increase the number of magnetic lines of force acting upon the relay armature to overcome the inertia of the armature and the biasing action of the armature spring 230.

The control of the spacing of the electrodes or carbons 32 and 33 through the energization of the drive motor 135 is as follows. As the arc is struck through relative movement of the motor housing and gear 122 by current flow through the solenoid coil 167, the electrodes are separated. The contacts of the current-responsive relay 210 are normally biased to closed position under the influence of a biasing spring 230. As the arc is established, current flows through coils 211 and 226, exerting a biasing force on the relay armature, tending to move the same in a direction to open the contacts of the relay. As long as the relay contacts are closed, the motor 135 is energized, and through the reduction gearing 145 and gears 122, 120, 96, the rack rods 90 and 98 are actuated to move the carbons toward each other, increasing the current flowing through coil 211 by the shortening of the arc until sufficient magnetic forces are set up to actuate the armature of the relay 210 and open the contacts controlling the motor circuit. When the contacts are opened, the motor immediately comes to rest, and the proper spacing of the electrodes has been established to provide the desired intensity of the arc. As the electrodes burn away at the zone of the arc, the current flow through the arc again decreases; and when the current is decreased to a predetermined value, the pull on the relay armature is decreased and the relay contacts are closed under the influence of the biasing spring 230 to again energize the motor 135 and move the carbons toward each other until the magnetic flux set up by current flow through coils 211 and 226 is sufficient to actuate the armature to again open the contacts of the motor circuit.

In the illustrated embodiment, it should be noted that the current for operating the armature of the motor 135 flows through the supplemental coil 226 of the relay 210. The coil 226 is arrnaged so that the magnetic lines of force or flux established by current flow therethrough augment the magnetic forces or flux established by current flow through the main relay coil 211. The armature of the relay is therefore urged to contact-closed position by the combined magnetic forces established by current flow through both coils 211 and 226. By this means, a substantial armature holding force is established which, when overcome by the relay spring, results in a rapid movement of the armature to open the contacts to interrupt the motor circuit and in this manner a fluttering of the movable contact of the relay 210 is avoided. As the arc gap increases due to the burning of the tips of the carbons, less current flows through the arc, and hence there is a decreased current flow through the relay winding 211. This decrease in current flow is accompanied by an increase in voltage in the circuit through the auxiliary relay coil 226. The contacts of the relay are thus maintained in closed position under the influence of the magnetic flux established by both relay windings. Through this arrangement a very effective means is provided for urging the contacts to closed position until the current flow through the arc has decreased to a value whereby the spring 230 of the relay armature overcomes the magnetic forces to cause a sudden and positive separation of the contacts of the motor circuit.

The arrangement of the invention facilitates the use of electrode or carbon-supporting carriages or brackets of identical construction and utilizes the drive gear 122 in a manner to initially separate the carbons or electrodes to strike the arc and thereafter to move the carbons in maintaining desired characteristics or intensity of the arc. The arrangement provides an automatic electrode separation means removed from the heat of the arc and enclosed to prevent the accumulation of dirt and dust in the arc-striking and electrode-controlling mechanism.

It is to be understood that a conventional, electrically energized relay may be used in lieu of the supplemental coil 220 of the transformer by connecting such a relay to receive electrical energy direct from the secondary winding 207 without departing from the spirit of the invention.

It has been previously mentioned herein that the armature of the motor 135 rotates at comparatively slow speed, for example, 240 revolutions per minute. It is desirable that the carbons or electrodes be moved at a comparatively slow speed to approximate the rate of burning away of the electrodes. To attain this result, the speed-reducing gearing 145 may be constructed and proportioned to rotate the gear 122, in actual practice, at a speed of about four revolutions per hour. It is to be understood that the relative speeds set forth are illustrative only and may be varied, depending upon the rate at which the electrodes are burned away or consumed. It is to be understood that the rate of feed of the electrodes toward each other is at least greater than the rate of consumption of the electrodes so that effective control of the electrode spacing may be had by the motor 135.

It is apparent that, within the scope of the invention, modifications and different arrangements may be made other than is herein disclosed, and the present disclosure is illustrative merely, the invention comprehending all variations thereof.

I claim:

1. In an arc lamp including a pair of electrodes between which an arc is to be established, in combination, a pair of relatively movable electrode-supporting carriages, a circuit for conveying electrical energy through the electrodes, a toothed member connected to each of said carriages, a gear meshing with the teeth of both of said members, an electric motor having an armature, a housing for said motor, speed-reducing gearing associated with said motor armature for rotating said gear at a comparatively low speed, means adapted to rotate said motor housing and said gear for causing initial separation of the electrodes to strike the arc, and means in the circuit of said electrodes and operable to energize the armature of said motor to control the spacing between the electrodes upon establishment of the arc therebetween.

2. In an arc lamp including a pair of electrodes between which an arc is to be established, in combination, a frame, a pair of electrode-supporting carriages mounted on said frame for relative movement, a toothed rod connected to each of said carriages, a gear meshing with the teeth of both of said rods, an electric motor having an armature, a housing for said motor, speed-reducing bearing associated with said motor armature for rotating said gear at a comparatively low speed, said motor housing being journally supported upon the frame, electromagnetic means arranged to rotate said motor housing and said gear for causing initial separation of the electrodes to strike the arc, a power circuit for said electrodes, and a relay in circuit with said electrodes operable to energize said motor to control the spacing between the electrodes upon establishment of the arc therebetween.

3. In an arc lamp including a pair of electrodes between which an arc is to be established, in combination, a frame, a pair of electrode-supporting carriages, a toothed rod connected to each of said carriages, a gear meshing with the teeth of both of said rods, an electric motor, a housing for said motor, means associated with said motor for rotating said gear at a comparatively low speed to move said electrodes for adjusting the space between the electrodes, electromagnetic means arranged to cause rotative movement of said motor housing and said gear about the axis of the gear for causing initial separation of the electrodes to strike the arc, a power circuit for said electrodes, and a current-controlled relay in circuit with said electrodes operable to energize said motor to control the spacing between the electrodes upon establishment of the arc therebetween.

4. An arc lamp, in combination, a pair of electrodes, carriage means supporting each of said electrodes for movement relative to each other, a housing, a shaft, means connecting the shaft with the carriage means for moving the same, an electrically energizable motor having a rotatable armature, speed reducing gearing in said housing connecting the motor armature with the shaft, said housing being journally supported for rotation about the axis of the shaft, and electrically energizable means connected with the housing for rotating the housing and shaft to move said carriage means causing initial separation of the electrodes to strike the arc.

5. In an arc lamp including a pair of electrodes between which an arc is to be established, in combination, a frame, a pair of electrode-supporting carriages mounted upon said frame for movement relative thereto, a rod connected to each of said electrode-supporting carriages driving means including a gear for simultaneously moving said rods in opposite directions, an electric motor having an armature and a housing structure, speed-reducing gearing connecting the armature of the motor to the said gear, said motor housing being supported upon said frame for rotation relative thereto, a current supply circuit for said electrodes, a motor circuit, an electrically energizable relay in said electrode circuit for controlling operation of the motor armature, and an electrically energizable means for rotating said motor housing and said gear for separating said electrodes to strike the arc.

6. In an arc lamp including a pair of electrodes between which an arc is to be established, in combination, a frame, a pair of electrode-supporting carriages, a rod connected to each of said electrode-supporting carriages, driving means including a gear for simultaneously moving said rods in opposite directions, an electric motor having an armature and a housing structure, speed-reducing gearing connecting the armature of the motor to the said gear, said motor housing being supported upon said frame for rotation relative thereto, a current supply circuit for said electrodes, a motor circuit, a current-responsive relay in said electrode circuit for controlling operation of the motor armature dependent upon current flow between the electrodes for controlling the intensity of the arc, and an electrically energized means for concomitantly rotating said motor housing and said gear for separating said electrodes to strike the arc.

7. In an arc lamp including a pair of electrodes between which an arc is to be established, in combination, a frame, a pair of electrode-supporting carriages, driving means including a gear for simultaneously moving said carriages in opposite directions, an electric motor having an armature and a housing structure, power transmission means connecting the armature of the motor to the said gear, said motor housing being supported upon said frame for rotation relative thereto, a current supply circuit for said electrodes, a motor circuit, a relay in said electrode circuit for controlling operation of the motor armature, electrically energizable means for concomitantly rotating said motor housing and said gear for separating said electrodes to strike the arc, and means for limiting rotation of the motor housing.

8. In an arc lamp including a pair of electrodes between which an arc is to be established, in combination, a frame, a pair of electrode-supporting carriages mounted on said frame for relative movement, a shaft, means connected with the shaft and having operative connection with said carriages for moving the carriages upon rotation of the shaft, an electric motor having a rotatable armature, a housing associated with the motor and journally supported for rotation about the axis of said shaft, speed reducing gearing in said housing driven by said motor armature for rotating the shaft at a comparatively low speed, electrically energizable means adapted to rotate said housing and said shaft for causing initial separation of the electrodes to strike the arc, and means operable to energize the armature of the motor to regulate the spacing between the electrodes upon establishment of the arc therebetween.

9. In an arc lamp, in combination, a pair of electrodes, a relatively movable support for each of said electrodes, each of said electrode supports including a rod formed with a toothed rack portion, a gear enmeshed with the rack portions of said rods, an electrically energizable motor having an armature, said motor including an enclosure, means for transmitting rotation of the motor armature to said gear for moving the electrodes toward each other, electrically energizable means having operative connection with said motor enclosure for rotating said enclosure to rotate said gear in a direction to move said electrodes away from each other, a circuit for delivering electrical energy through said electrodes, a motor circuit, means for controlling operation of the motor armature, and means for energizing said electrically energizable means concomitantly with the delivery of electrical energy through said electrodes to initially separate the electrodes for establishing an arc therebetween.

10. In an arc lamp, in combination, a pair of electrodes, a relatively movable support for each of said electrodes, each of said electrode supports including a rod formed with a toothed rack portion, a gear enmeshed with the rack portions of said rods, manual means for rotating said gear to adjust the relative positions of said electrodes, an electrically energizable motor having an armature, said motor including an enclosure, means including speed-reducing gearing for transmitting rotation of the motor armature to said gear for moving the electrodes toward each other, electromagnetic means having operative connection with said motor enclosure for rotating said enclosure to rotate said gear in a direction to move said electrodes away from each other, a circuit for delivering electrical energy through said electrodes to establish an arc, a motor circuit, mean in said electrode circuit for controlling operation of the motor armature, and means for energizing said electromagnetic means concomitantly with the delivery of electrical energy through said electrodes to initially separate the electrodes for establishing an arc therebetween.

11. In an arc lamp, in combination, a frame, a pair of electrode carriages mounted for relative movement in opposite directions on said frame, means for supporting an electrode upon each of said carriages whereby said electrodes are disposed in coaxial relationship, a pair of rods, each of said rods being connected with one of the carriages, guide means associated with said rods for maintaining the electrodes in coaxial relationship during relative movement of said carriages, means for moving said rods to control the relative positions of said electrodes, said means including a gear, an electrically energized motor having a housing, said motor housing being journally supported upon said frame, said electric motor having an armature, motion-transmitting means connecting said armature with said gear whereby rotation of the motor armature causes rotation of said gear, a link for moving the motor housing, an electrode circuit, electrically energized means associated with said link for moving the latter to cause rotation of the motor housing and said gear for separating the electrodes to strike the arc, and an electrically energizable relay intercalated in the electrode circuit for controlling the energization of the motor for determining the spacing of the electrodes through relative rotation of the motor armature and said gear.

12. In an arc lamp, in combination, a frame, a pair of electrode carriages mounted for relative movement in opposite directions on said frame, means for supporting an electrode upon each of said carriages whereby said electrodes are disposed in coaxial relationship, a pair of rods, each of said rods being connected with one of the carriages, guide means associated with said rods for maintaining the electrodes in coaxial relationship during relative movement of said carriages, means for causing simultaneous movement of said rods to control the relative positions of said electrodes, said means including a gear, an electrically energized motor having an enclosure, said motor housing being journally supported upon said frame, said electric motor having an armature, motion-transmitting means connecting said armature with said gear whereby rotation of the motor armature causes rotation of said gear at a comparatively low speed, a link for moving the motor housing, an electrode circuit, electrically energized means associated with said link for moving the latter to cause rotation of the motor housing and said gear for separating the electrodes to strike the arc, an electrically energizable relay intercalated in the electrode circuit for controlling the energization of the motor for determining the spacing of the electrodes through rotation of the motor armature and said gear, and means for limiting relative rotation of the motor housing.

13. In an arc lamp, in combination, a frame, a pair of electrode carriages mounted for relative movement in opposite directions on said frame, means for supporting an electrode upon each of said carriages whereby said electrodes are disposed in coaxial relationship, a pair of rods, each of said rods being connected with one of the carriages, means including a gear for causing simultaneous movement of said rods to control the relative positions of said electrodes, an electrically energized motor having a housing, said motor housing being journally supported upon said frame, said electric motor having a rotatable armature, motion-transmitting means connecting said armature with said gear whereby rotation of the motor armature causes rotation of said gear, a link, an electrode circuit, electrically energized means associated with said link for moving the latter to cause rotation of the motor housing and said gear for separating the electrodes to strike the arc, an electrically energizable relay intercalated in the electrode circuit for controlling the energization of the motor armature for controlling the spacing of the electrodes through rotation of the motor armature and said gear, and means associated with the link for limiting relative rotation of the motor housing.

References Cited in the file of this patent

UNITED STATES PATENTS

| | | |
|---|---|---|
| 1,497,071 | Daykin | June 10, 1924 |
| 1,551,558 | Hallberg | Sept. 1, 1925 |
| 1,625,315 | Hall | Apr. 19, 1927 |
| 1,662,434 | Palmer | Mar. 13, 1928 |
| 2,616,059 | Benson | Oct. 28, 1952 |